(12) United States Patent
Curran et al.

(10) Patent No.: US 10,174,436 B2
(45) Date of Patent: Jan. 8, 2019

(54) PROCESS FOR ENHANCED CORROSION PROTECTION OF ANODIZED ALUMINUM

(71) Applicant: Apple Inc., Cupertino, CA (US)

(72) Inventors: James A. Curran, Morgan Hill, CA (US); William A. Counts, Sunnyvale, CA (US); Aaron D. Paterson, Livermore, CA (US)

(73) Assignee: Apple Inc., Cupertino, CA (US)

(*) Notice: Subject to any disclaimer, the term of this patent is extended or adjusted under 35 U.S.C. 154(b) by 206 days.

(21) Appl. No.: 15/092,563

(22) Filed: Apr. 6, 2016

(65) Prior Publication Data

US 2017/0292202 A1    Oct. 12, 2017

(51) Int. Cl.
| | |
|---|---|
| *C25D 11/18* | (2006.01) |
| *H05K 5/04* | (2006.01) |
| *G06F 1/16* | (2006.01) |
| *C25D 11/20* | (2006.01) |
| *C25D 11/12* | (2006.01) |

(52) U.S. Cl.
CPC ............ *C25D 11/18* (2013.01); *C25D 11/12* (2013.01); *C25D 11/20* (2013.01); *G06F 1/1613* (2013.01); *H05K 5/04* (2013.01)

(58) Field of Classification Search
None
See application file for complete search history.

(56) References Cited

U.S. PATENT DOCUMENTS

| | | | |
|---|---|---|---|
| 2,692,851 A | 10/1954 | Burrows | |
| 3,388,050 A | 6/1968 | Wainer et al. | |
| 3,411,994 A | 11/1968 | Wainer et al. | |
| 3,985,629 A | 10/1976 | Kimura | |
| 4,039,355 A | 8/1977 | Takahashi et al. | |
| 4,066,516 A | 1/1978 | Sato | |
| 4,483,751 A | 11/1984 | Murayama et al. | |
| 4,518,468 A | 5/1985 | Fotland et al. | |
| 4,606,796 A | 8/1986 | Hanazima et al. | |
| 4,631,112 A | 12/1986 | Usui et al. | |
| 4,856,326 A | 8/1989 | Tsukamoto | |

(Continued)

FOREIGN PATENT DOCUMENTS

| | | |
|---|---|---|
| CH | 691064 A5 | 4/2001 |
| CN | 1254028 A | 5/2000 |

(Continued)

OTHER PUBLICATIONS

International Search Report and Written Opinion for PCT Application No. PCT/US2015/025000 dated Jan. 26, 2016.

(Continued)

*Primary Examiner* — John J Figueroa

(74) *Attorney, Agent, or Firm* — Dickinson Wright RLLP

(57) ABSTRACT

Processes for enhancing the corrosion resistance of anodized substrates are disclosed. In some embodiments, the process involves a second anodizing operation that targets an area of the substrate that is left inadequately protected by a first anodizing operation, and also targets defects that may have been arisen from intermediate processing operations such as laser-marking operations. The second anodizing operation can be conducted in a non-pore-forming electrolyte, and grows a thick protective barrier film over inadequately protected areas of the substrate, such as laser-marking treated areas.

12 Claims, 14 Drawing Sheets

(56) References Cited

U.S. PATENT DOCUMENTS

| | | |
|---|---|---|
| 4,894,127 A | 1/1990 | Wong et al. |
| 4,987,766 A | 1/1991 | Brar et al. |
| 5,066,368 A | 11/1991 | Pasqualoni et al. |
| 5,078,845 A | 1/1992 | Kunugihara et al. |
| 5,277,788 A | 1/1994 | Nitowski et al. |
| 5,336,341 A | 8/1994 | Maejima et al. |
| 5,472,788 A | 12/1995 | Benitez-Garriga |
| 5,705,225 A | 1/1998 | Dornfest et al. |
| 5,919,561 A | 7/1999 | Fuchs et al. |
| 6,027,629 A | 2/2000 | Hisamoto et al. |
| 6,235,409 B1 | 5/2001 | Serafin et al. |
| 6,339,958 B1 | 1/2002 | Tsui et al. |
| 6,581,446 B1 | 6/2003 | Deneuville et al. |
| 7,527,872 B2 | 5/2009 | Steele et al. |
| 7,732,056 B2 | 6/2010 | Bhatnagar et al. |
| 8,016,948 B2 | 9/2011 | Wang et al. |
| 8,309,237 B2 | 11/2012 | Levendusky et al. |
| 8,535,505 B2 | 9/2013 | Yi et al. |
| 8,691,403 B2 | 4/2014 | Amakusa et al. |
| 8,950,465 B2 | 2/2015 | Lin et al. |
| 8,962,163 B2 | 2/2015 | Shimao et al. |
| 8,968,548 B2 | 3/2015 | Lai et al. |
| 9,312,511 B2 | 4/2016 | Mandlik et al. |
| 9,349,536 B2 | 5/2016 | Lee et al. |
| 9,359,686 B1 * | 6/2016 | Curran .................. C25D 11/04 |
| 9,512,510 B2 | 12/2016 | Hatta |
| 9,669,604 B2 | 6/2017 | Tatsumi et al. |
| 9,869,030 B2 | 1/2018 | Curran et al. |
| 9,869,623 B2 | 1/2018 | Hamann et al. |
| 2003/0196907 A1 | 10/2003 | Viola |
| 2004/0004003 A1 | 1/2004 | Hesse |
| 2005/0061680 A1 | 3/2005 | Dolan |
| 2005/0106403 A1 | 5/2005 | Yui |
| 2006/0019035 A1 | 1/2006 | Munz et al. |
| 2006/0086475 A1 | 4/2006 | Miyashita et al. |
| 2008/0274375 A1 | 11/2008 | Ng et al. |
| 2008/0283408 A1 | 11/2008 | Nishizawa |
| 2009/0050485 A1 | 2/2009 | Wada et al. |
| 2009/0152120 A1 | 6/2009 | Cao et al. |
| 2009/0233113 A1 | 9/2009 | Hisamoto et al. |
| 2010/0024534 A1 | 2/2010 | Li et al. |
| 2010/0264036 A1 | 10/2010 | Hatanaka et al. |
| 2010/0326839 A1 | 12/2010 | Morikawa et al. |
| 2011/0252874 A1 | 10/2011 | Patten et al. |
| 2011/0297319 A1 | 12/2011 | Chen et al. |
| 2012/0000783 A1 | 1/2012 | Suda et al. |
| 2012/0103819 A1 | 5/2012 | Chang et al. |
| 2012/0298513 A1 | 11/2012 | Shimao et al. |
| 2013/0008796 A1 | 1/2013 | Silverman et al. |
| 2013/0075262 A1 | 3/2013 | Teng |
| 2013/0153427 A1 | 6/2013 | Tatebe |
| 2013/0156635 A1 | 6/2013 | Lee et al. |
| 2013/0302641 A1 | 11/2013 | Zhang et al. |
| 2013/0319868 A1 | 12/2013 | Yoshida et al. |
| 2013/0319872 A1 | 12/2013 | Woodhull et al. |
| 2014/0061054 A1 | 3/2014 | Ye |
| 2014/0083861 A1 | 3/2014 | Askin et al. |
| 2014/0262790 A1 | 9/2014 | Levendusky et al. |
| 2015/0132541 A1 | 5/2015 | McDonald et al. |
| 2016/0060783 A1 * | 3/2016 | Curran .................. C25D 11/12 205/50 |
| 2016/0237586 A1 * | 8/2016 | Curran .................. C25D 11/04 |
| 2016/0289858 A1 | 10/2016 | Curran et al. |
| 2016/0290917 A1 | 10/2016 | Hamann et al. |
| 2017/0051425 A1 | 2/2017 | Curran et al. |
| 2017/0051426 A1 | 2/2017 | Curran et al. |
| 2017/0088917 A1 | 3/2017 | Curran et al. |
| 2017/0121837 A1 * | 5/2017 | Tatebe .................. C25D 11/16 |
| 2018/0049337 A1 | 2/2018 | Curran et al. |

FOREIGN PATENT DOCUMENTS

| | | |
|---|---|---|
| CN | 1616709 A | 5/2005 |
| CN | 1774158 A | 5/2006 |
| CN | 1965618 A | 5/2007 |
| CN | 101287861 A | 10/2008 |
| CN | 101298690 A | 11/2008 |
| CN | 101325849 A | 12/2008 |
| CN | 102333897 A | 1/2012 |
| CN | 102654782 A | 9/2012 |
| CN | 102666894 A | 9/2012 |
| CN | 103484737 A | 1/2014 |
| CN | 103484916 A | 1/2014 |
| CN | 103526088 A | 1/2014 |
| CN | 103732772 A | 4/2014 |
| CN | 104762538 A | 7/2015 |
| EP | 997545 A1 | 5/2000 |
| EP | 1688020 B1 | 8/2006 |
| EP | 1397244 B1 | 12/2009 |
| EP | 2301760 A2 | 3/2011 |
| EP | 2817948 A1 | 12/2014 |
| JP | H0347937 A | 2/1991 |
| JP | 2000313996 A | 11/2000 |
| JP | 2009209426 A | 9/2009 |
| KR | 20120021616 A | 3/2012 |
| KR | 101235350 B1 | 2/2013 |
| WO | 2010099258 A1 | 9/2010 |
| WO | 2013123770 A1 | 8/2013 |
| WO | 2014045886 A1 | 3/2014 |
| WO | 2014149194 A1 | 9/2014 |
| WO | 2015199639 A1 | 12/2015 |

OTHER PUBLICATIONS

Garcia-Vergara, S. et al; "Morphology of enriched alloy layers in an anodized Al—Cu alloy" Applied Surface Science, 205 (2003), p. 121-127.

Alwitt, RS. and RC. McClung, "Mechanical Properties of Anodized Aluminum Coatings"; Proceedings of the SUR/FIN792, American Electroplaters and Surface Finishers Society, Atlanta, Georgia, Jun. 1992.

Yann Goueffon et al., "Study of Degradation Mechanisms of Black Anodic Films in Simulated Space Environment" URL:http://webcache.googleusercontenl.com/search?q=cache:fsJq5LjVTVIJ:esmal.esa.inl/materials_news/isme09/pf/6Contamination/S8%2520%2520Goueffon.pdf+&cd=1&hl=en&ct=clnk&gl=us.

Henkel Corporation "BONDERITE M-ED 9000 Anodizing Seal (Known as Anoseal 9000)" Technical Process Bulletin Issued Jun. 10, 2013.

Hao et al., "Sealing Processes of Anodic Coatings—Past, Present, and Future", Metal Finishing, vol. 98, Issue 12, Dec. 2000, p. 8-18.

International Search Report & Written Opinion for PCT Application No. PCT/US2015/010736 dated Oct. 29, 2015.

International Search Report & Written Opinion for PCT Application No. PCT/US2015/024349 dated Dec. 17, 2015.

International Search Report & Written Opinion for PCT Application No. PCT/US2014/053595 dated Jun. 24, 2015.

Habazaki et al., "Nanoscale Enrichments of Substrate Elements in the Growth of Thin Oxide Films", Corrosion Science, vol. 39, No. 4, pp. 731-737, 1997.

Vesborg et al., "Addressing the terawatt challenge: scalability in the supply of chemical elements for renewable energy," RSC Advances, 2, pp. 7933-7947, 2012.

European Patent Application No. 16150283.6—European Search Report dated Jun. 9, 2016.

International Patent Application No. PCT/US2016/043256—International Search Report and Written Opinion dated Oct. 12, 2016.

Diggle et al., Incorporation of anions: "Anodic oxide films on aluminum", Chemical Reviews, vol. 69, pp. 365-405 (1969), (41 Pages).

Charles Grubbs, "Anodizing of Aluminium", Metalfinishing, pp. 397-412, (16 Pages).

Milton Stevenson, "Anodizing", ASM Handbook vol. 5 (1994), 12 Pages.

Nang et. al., "Brilliant and tunable color of carbon-coated thin anodic aluminum oxide films", Appl. Phys. Lett., 91, 2007, 4 Pages.

(56) References Cited

OTHER PUBLICATIONS

Brock, et al., "European Coatings Handbook", 2000, Curt R. Vincentz, (pp. 374-376), 5 Pages.
Taiwanese Patent Application No. 105125817—Office Action and Search Report dated Apr. 19, 2017.
Achbach et.al. WADC technical report 55-150, Part VI, Project No. 7360, 1957.
Chinese Application for Invention No. 201610011395.4—First Office Action dated Jul. 21, 2017.
Saenz de Miera et. al. Surface and Interface Analysis, 2012 242, 241-246.
John C. Ion. Laser Processing of Engineering Materials. Elsevier, 2005 p. 160.
Chinese Application for Invention No. 201610202013.6—First Office Action dated Sep. 15, 2017.
Chinese Application for Utility Model No. 201490001542.4—First Office Action dated Sep. 27, 2017.
European Patent Application No. 16150283.6—Office Action dated Jan. 18, 2018.
Chinese Application for Utility Model No. 201490001542.4—Second Office Action dated Feb. 1, 2018.
Chinese Patent Application No. 201610011395.4—Second Office Action dated Feb. 14, 2018.
Guo Jialin etc., "Analysis on affecting factors of thermal cracking behavior of anodic oxide film on 6060 aluminum alloy", Materials Research and Application, vol. 5, No. 3, Sep. 2011, p. 229-232.
Chinese Application for Invention No. 201610202013.6—Second Office Action dated Apr. 11, 2018.

* cited by examiner

PROCESS FOR ENHANCED CORROSION PROTECTION OF ANODIZED ALUMINUM

FIELD

The described embodiments relate generally to anodic films and anodizing processes. More particularly, the present embodiments relate to processes for repairing defects, such as cracks, within anodic films so as to enhance the corrosion protection properties of the anodic films.

BACKGROUND

Anodizing is a method of providing a protective anodic oxide film on a metal substrate, often used in industry to provide a protective and sometimes cosmetically appealing coating to metal parts. When subjected to any of a number of manufacturing processes, such as laser marking or other thermal operations, however, anodic oxide films can crack due to internal stresses. Machining and handling can also form cracks or crack-like defects. Substrate geometry can also increase the likelihood of an overlying anodic oxide film to have cracks or crack-like defects. For example, anodic films formed on corners or convex curvatures of a substrate can develop cracks along these corners and curvatures.

Although stress-induced cracks are generally very small, if the cracks span the entire thickness of an anodic oxide film, they can present pathways for water or other corrosion-inducing agents to reach the underlying metal substrate through an otherwise protective metal oxide film. Over time and repeated exposure to water or other corrosion-inducing agents during the service life of a part, corrosion of the underlying metal substrate can quickly escalate and further compromise the protective properties of the anodic oxide film. What is needed, therefore, are manufacturing methods for repairing cracks within anodic oxide films, thereby enhancing the corrosion protection of the anodic oxide films.

SUMMARY

This paper describes various embodiments that relate to anodic oxide films and processes for enhancing the corrosion protection properties of anodic oxide films. The processes involve blocking pathways for water or other corrosion-inducing agents from reaching an underlying substrate via a crack or defect within an anodic oxide film. In particular embodiments, the methods involve thickening a barrier layer, or a portion of the barrier layer, of the anodic oxide film.

According to one embodiment, a method of anodizing a substrate is described. The method includes performing a first anodizing operation on the substrate. The first anodizing operation forms an anodic film on the substrate. The method also includes performing an intermediate operation on the anodic film. The intermediate operation forms a defect within the anodic film that provides a pathway through the anodic film to substrate. The method further includes performing a second anodizing operation on the substrate. The second anodizing operation forms a metal oxide plug within the anodic film that blocks the pathway.

According to another embodiment, an enclosure for an electronic device is described. The enclosure includes a metal substrate. The enclosure also includes an anodic coating covering a surface of the metal substrate. The anodic coating includes a defect region. The enclosure further includes a metal oxide plug within the defect region of the anodic film.

According to a further embodiment, an enclosure for an electronic device is described. The enclosure includes a metal substrate having a surface with a surface feature. The enclosure also includes an anodic coating covering the surface of the metal substrate. The anodic coating includes a crack located near the surface feature of the metal substrate. The anodic coating includes a metal oxide plug within the crack.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
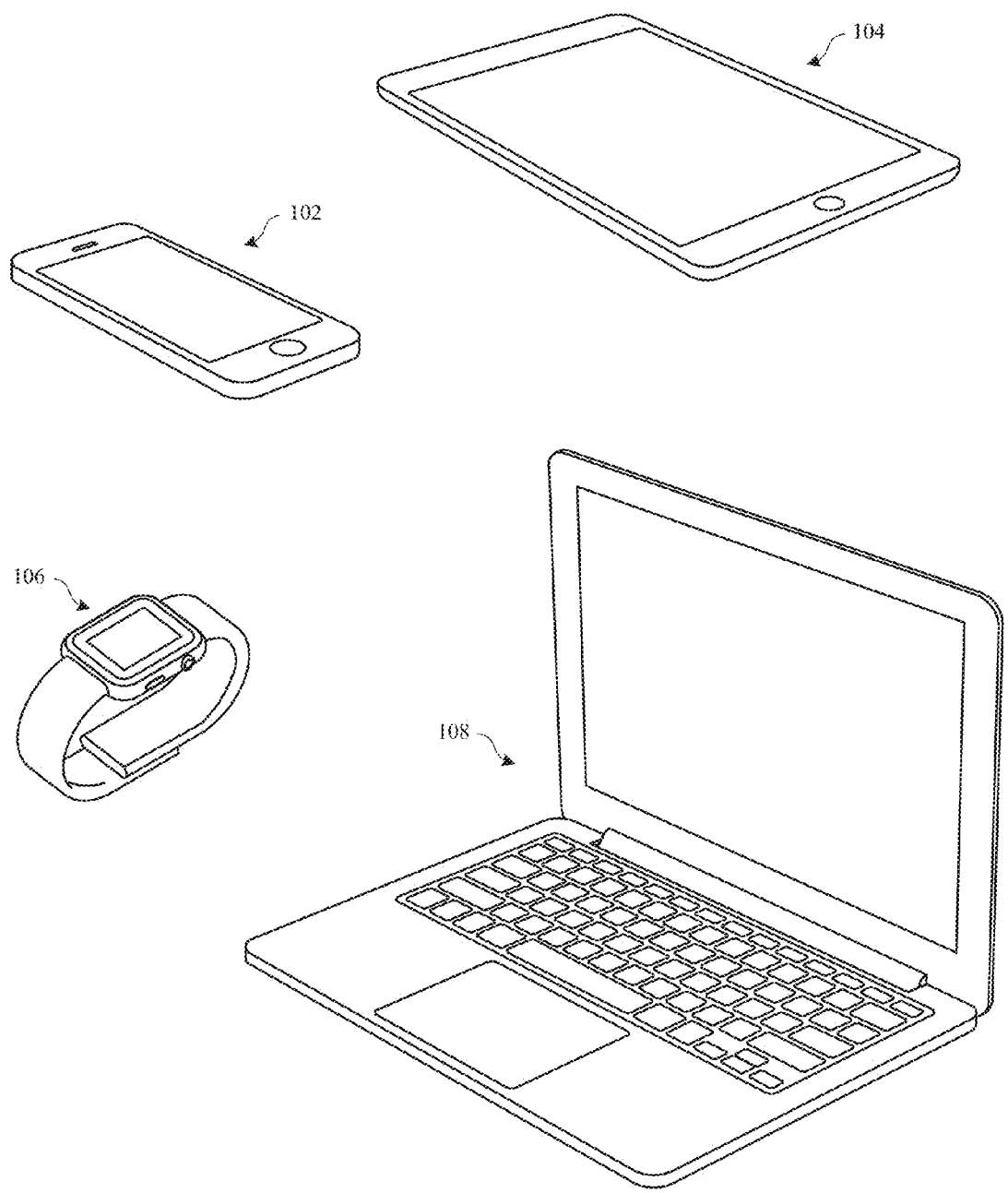
FIG. 1 shows perspective views of devices having anodized surfaces that can be treated using the methods described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Processes for improving the corrosion protection properties of anodic oxide films are described. In general, anodic oxide films are made of metal oxide material, which is generally harder than the underlying metal of the substrate. Therefore, anodizing is commonly used in industry to provide hard protective coatings for metal parts. Some manufacturing processes, however, such as laser-marking, thermal operations, machining and handling, can put stress on the anodic oxide films and may cause them to crack or acquire other defects. Although many of these cracks can be very small—on the scale of micrometers or tens of micrometers wide—they can allow water or other corrosion-inducing agents to reach the underlying metal substrate. Thus, these cracks can act as pathways for corrosion-inducing agents to reach the underlying metal substrate. This can eventually cause the metal substrate to corrode, especially if the metal substrate is relatively susceptible to corrosion, such as some alloys that have certain alloying elements.

Techniques described herein involve increasing the protective characteristics of an anodic oxide film by thickening a barrier layer, or a portion of the barrier layer, of the anodic oxide film. Conventionally, the barrier layer corresponds to a thin non-porous region of the anodic oxide film proximate to the metal substrate, and of thickness approximately equivalent to half an anodic cell pore wall thickness (typically 10-20 nanometers thick in Type II anodic oxides). Thickening this non-porous barrier layer, or a portion thereof, can block off the pathways created by the cracks within the anodic oxide film where corrosion-inducing agents can enter and reach the underlying metal substrate.

The barrier layer thickening can be accomplished by performing an additional anodizing process on the already-formed anodic oxide film. The additional anodizing process can be a non-pore-forming anodizing process so as to increase the thickness of the non-porous barrier layer. In some embodiments, the additional anodizing process is performed prior to an anodic film sealing process, resulting in a generally uniform thickening of the barrier layer. In some embodiments, the additional anodizing process is performed after an anodic film sealing process, resulting in localized thickening of the barrier layer—in particular, at locations corresponding to the crack or defects within the anodic oxide film.

The methods described herein may be particularly useful in applications that include metal substrates made of certain types of aluminum alloys that are relatively sensitive to corrosion. For example, some aluminum alloys that include relatively high amounts of zinc and magnesium (e.g., some 7000 series alloys) may be more susceptible to the above-described corrosion compared to aluminum alloys having lower amounts of zinc and magnesium (e.g., some 6000 series alloys). Thus, the methods described herein can provide a more robust corrosion protection layer on these corrosion sensitive alloys. It should be noted, however, that the methods described herein are not limited to use on any particular aluminum alloy, or on any particular metal. That is, the methods can be used on any suitable anodizable metal substrate.

As used herein, the terms anodic oxide, anodic oxide coating, anodic oxide film, anodic film, anodic layer, anodic coating, oxide film, oxide layer, oxide coating, metal oxide, etc. can be used interchangeably and can refer to suitable metal oxide materials, unless otherwise specified.

Methods described herein are well suited for providing cosmetically appealing surface finishes to consumer products. For example, the methods described herein can be used to form durable and cosmetically appealing anodized substrates used in enclosures, or portions of enclosures, for computers, portable electronic devices, wearable electronic devices, and electronic device accessories, such as those manufactured by Apple Inc., based in Cupertino, Calif.

These and other embodiments are discussed below with reference to FIGS. 1-13. However, those skilled in the art will readily appreciate that the detailed description given herein with respect to these Figures is for explanatory purposes only and should not be construed as limiting.

The methods described herein can be used to form durable and cosmetically appealing anodic oxide coatings for metallic surfaces of consumer devices. FIG. 1 shows consumer products than can be manufactured using methods described herein. FIG. 1 includes portable phone 102, tablet computer 104, smart watch 106 and portable computer 108, which each can include housings that are made of metal or have metal sections. Aluminum alloys are often a choice metal material due to their light weight and ability to anodize and form a protective anodic oxide coating that protects the metal surfaces from scratches. The anodic oxide coatings can be colorized by infusing dyes within pores of the anodic oxide coatings, adding numerous cosmetic options for product lines.

During manufacturing, the anodized metal portions of devices 102, 104, 106 and 108 can be exposed to a number of mechanical, chemical and thermal processes. Such processes can include machining, surface finishing, chemical cleaning, laser marking, and other thermal operations. These manufacturing processes can sometimes cause stress-induced fractures, or cracks, to form within the anodic oxide coatings that are supposed to protect the underlying metal substrates.

Figure 2A:
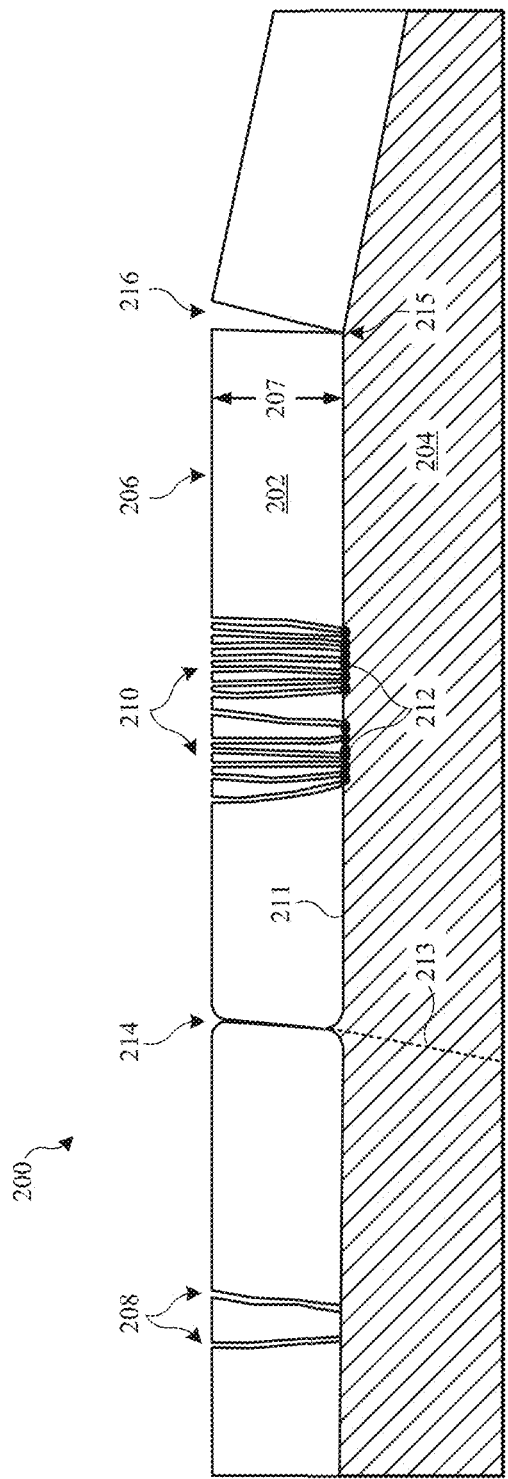
FIG. 2A shows a cross-section view of an anodized part, which includes an anodic oxide film with stress-induced cracks.

FIG. 2A shows a cross-section view of anodized part 200, which includes anodic oxide film 202 with some of these stress-induced cracks. Anodic oxide film 202 is formed on metal substrate 204, and can be formed by converting surface portions of metal substrate 204 to its corresponding metal oxide. For example, an aluminum or aluminum metal substrate 204 can be converted to a corresponding aluminum oxide film 202. One of the most common methods of converting metal to its metal oxide is by anodizing, which is an electrolytic process whereby metal substrate 204 acts as an anode. The type of anodizing or oxidative operation can vary depending on desired structural and cosmetic qualities of anodic oxide film 202. Most conventional anodizing processes are pore-forming anodizing processes, whereby metal oxide material is simultaneously being formed and dissolved by the electrolyte, forming elongated pores within anodic oxide film 202. For example, type II anodizing (as defined by MIL-A-8625) generally involves anodizing within a sulfuric acid electrolyte and typically results in a porous, relatively transparent and cosmetically appealing anodic oxide film 202.

In many applications, it is ideal for anodic oxide film 202 to be defect-free, such as represented by defect-free region 206. As shown, defect-free region 206 is an area of anodic oxide film 202 that does not have defects that span thickness 207 of anodic oxide film 202. An anodic film that is completely defect-free, however, is very rarely achieved, if ever—at least over a large area. Note that anodic oxide film 202, including defect-free region 206, does not show pores that are formed within anodic oxide film 202 during typical anodizing processes, such as type II anodizing. These pores, because of their small size, are not generally considered defects. Furthermore, these pores can be sealed using a sealing process, which will be described in detail below.

As described above, cracks within an anodic oxide film can result from any of a number of mechanisms. For example, cracks 208 can result from mechanically or thermally induced strain of part 200, such as by machining, surface finishing or handling of part 200. Cracks 210 can be induced by laser-marking, where the metal substrate 204 at interface 211 between metal substrate 204 and anodic oxide film 202 is melted by a laser wavelength to which anodic oxide film 202 is largely transparent in order to produce a dark or black mark 212. Such laser-marking operations can cause intense localized heating and strain of anodic oxide film 202, which can result in the formation of cracks 210. Cracks 208, 210, 214 and 216 can also be referred to generally as defect regions within anodic oxide film 202.

Concentrations of second-phase particles in metal substrate 204—such as might occur on grain boundary 213—may result in crack or defective region 214 to form within anodic oxide film 202 due to excessive dissolution or inhibited growth of anodic oxide film 202 near grain boundary 213. That is, grain boundary 213 can correspond to a surface feature, albeit very small, on metal substrate 204 that can cause a corresponding defective region or crack 214 to form within anodic oxide film 202. That is, crack 214 can propagate from grain boundary 213 within metal substrate 204. In addition, the shape of metal substrate 204 can also affect the anodic oxide film 202. For example, protruding feature 215, which can correspond to corner or edge of metal substrate 204, can also result in crack 216 to form within anodic oxide film 202 simply due to the convex geometry of protruding feature. That is, protruding feature 215 has a convex radius, which can cause a gap or crack 216 to develop during an anodizing process. In some cases, protruding feature 215 is a deliberately engineered macroscopic feature of metal substrate 204. In other cases, protruding feature 215 is a microscopic texture, such as the peaks on a textured surface (e.g., blasted surface) of metal substrate 204.

Each type of cracks 208, 210, 214 and 216 can extend through thickness 207 of anodic oxide film 202, and thus can present a pathway for corrosion-inducing agents to reach metal substrate 204. It should be noted that a metal substrate 204 made of aluminum alloy is often inherently corrosion resistant, and even a defective anodic oxide film 202 can provide a sufficient barrier against most corrosive environments. However, for certain types of aluminum alloys having certain alloying elements, everyday substances that part 200 can be exposed to (e.g., water, sweat) can be sufficient to cause corrosion at these crack 208, 210, 214 and 216—at least under long-term exposure. This has been simulated using tests that accelerate exposure to such substances in order to evaluate chemical sensitivity of part 200.

Many anodizing processes include hydrothermal sealing processes, whereby anodic oxide film 202 is immersed in a hot aqueous solution or steam. The hydrothermal sealing process hydrates exposed portions of the metal oxide material of anodic oxide film 202, causing the metal oxide material to swell and close up pores with anodic oxide film 202 that were formed during the anodizing process. This greatly improves the corrosion resistance of anodic oxide film 202 since the anodic pores can also provide pathways for corrosion-inducing agents to reach metal substrate 204. However, the pores formed during the anodizing process are extremely small, typically on the scale of less than 20 nanometers in diameter. Cracks 208, 210, 214 and 216, however, are typically too wide for conventional hydrothermal sealing processes to sufficiently close and provide significant protection of metal substrate 204 against corrosion-inducing agents. Thus, even after a conventional sealing process, cracks 208, 210, 214 and 216 can still provide pathways to metal substrate 204.

Figure 2B:
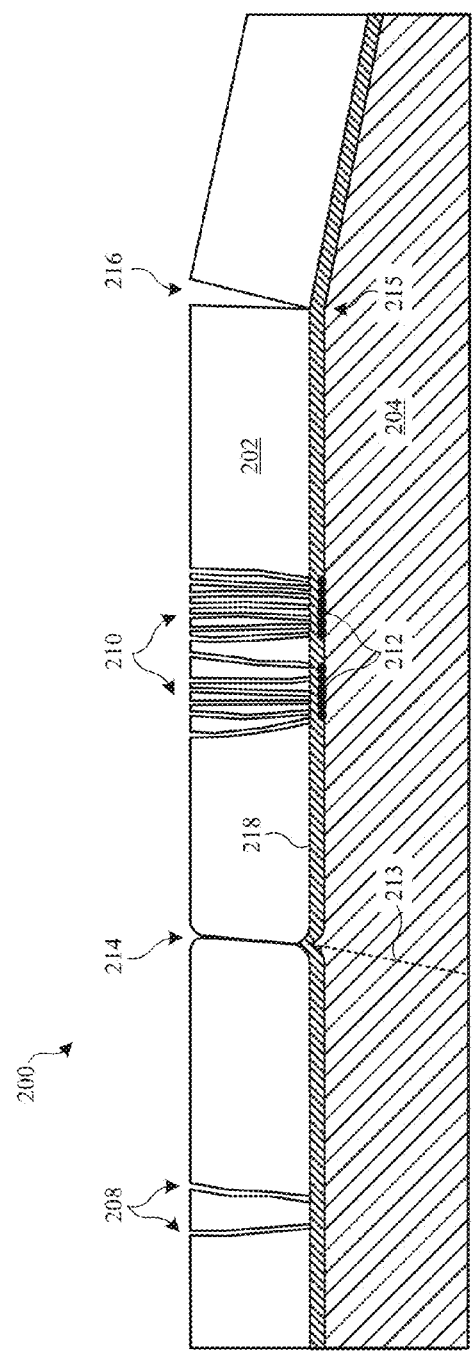
FIG. 2B shows a cross-section view of the anodized part of FIG. 2A after a barrier layer thickening process has been performed.
Figure 2C:
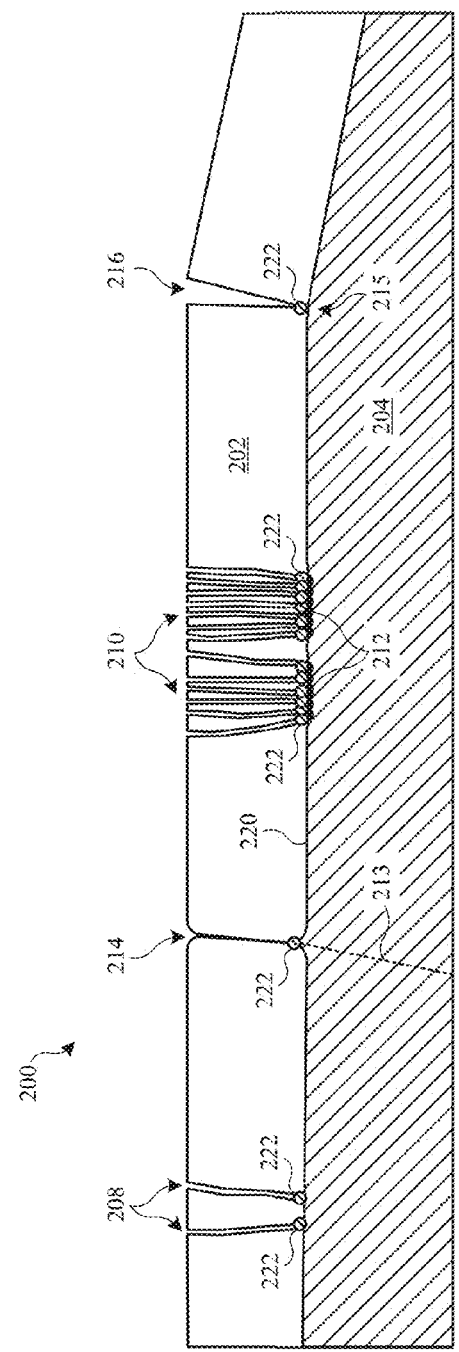
FIG. 2C shows a cross-section view of the anodized part of FIG. 2A after a sealing process followed by a barrier layer thickening process.

The techniques provided herein address these problems by performing a barrier layer thickening process that thickens the barrier layer over metal substrate 204 at cracks 208, 210, 214 and 216. The barrier layer thickening is accomplished by performing an additional anodizing operation on the already anodized part 200. The additional anodizing process can be performed before a sealing operation or after a sealing operation, both of which can enhance the corrosion protection of anodic oxide film 202. FIGS. 2B and 2C illustrate part 200 after barrier layer thickening processes been performed prior to sealing (FIG. 2B) and after sealing (FIG. 2C).

FIG. 2B shows part 200 after a barrier layer thickening process has been performed and prior to a sealing operation. The barrier layer thickening can involve exposing part 200 to an additional anodizing process that promotes the growth of anodic oxide film 202, but does so in such a way that promotes non-porous growth. In particular, the thin barrier layer formed during the previous anodizing process used to form anodic oxide film 202 is thickened, thereby forming thickened barrier layer 218. As shown, thickened barrier layer 218 substantially uniformly covers metal substrate 204—effectively closing off access for corrosion-inducing agents to reach metal substrate 204 via cracks 208, 210, 214 and 216. For laser marking induced cracks 210, mark 212 remains dark and visible to a user of part 200. After thickened barrier layer 218 is formed, part 200 may undergo an optional sealing process to close of the nano-scale pores within anodic oxide film 202.

FIG. 2C shows part 200 after undergoing an alternative process than shown in FIG. 2B. In particular, part 200 has undergone a sealing process (e.g., a hydrothermal sealing process as described above), followed by a barrier layer thickening process. The sealing process closes off the nano-scale pores formed during the anodizing process to form anodic oxide film 202. The sealed anodic oxide film 202 provides limited access to metal substrate 204 during the additional anodizing process, such that barrier layer 220 is preferentially thickened at portions of cracks 208, 210, 214 and 216 near metal substrate 204. This forms thickened barrier layer sections 222, which are localized at 208, 210, 214 and 216 near metal substrate 204. Thickened barrier layer sections 222 can block off access for corrosion-inducing agents to reach metal substrate 204 via cracks 208, 210, 214 and 216.

Figure 3A:
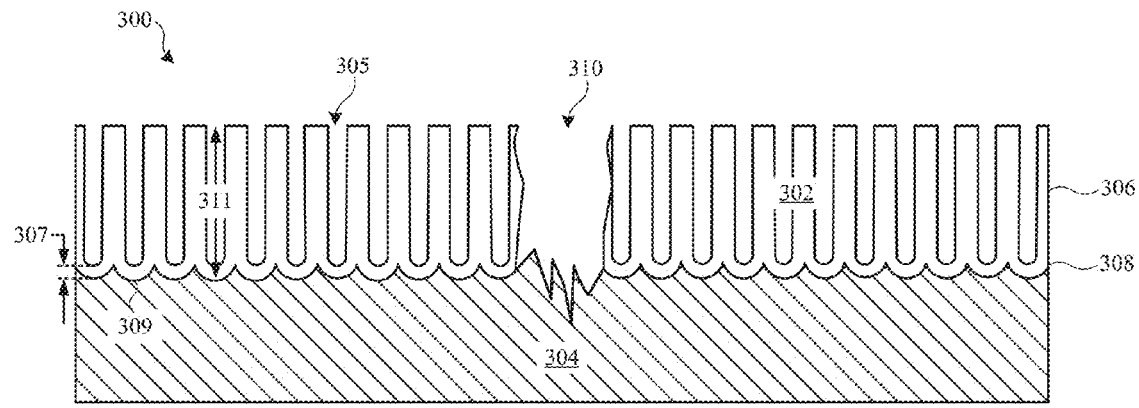
FIGS. 3A and 3B show cross-section views of an anodized part before and after a barrier layer thickening process has been performed.

Reference will now be made to FIGS. 3A, 3B, 4A and 4B, which show detailed aspects of barrier layer thickening processes, in accordance with some embodiments. FIG. 3A shows part 300 after an anodizing process has been performed to convert a portion of metal substrate 304 to anodic oxide film 302. This anodizing process forms a porous anodic oxide film 302 in that pores 305 are formed within porous portion 306 of anodic oxide film 302. Any suitable anodizing process can be used. In some embodiments, a type II anodizing process involving the use of a sulfuric acid based electrolytic bath is used. The size and shape of pores 305 can vary depending on anodizing processing parameters, such as type of electrolytic bath, current density and voltage. In some embodiments, pores 305 have an average diameter of less than about 50 nanometers in diameter—in some embodiments, between about 10 nanometers and about 20 nanometers in diameter. Barrier layer 308 corresponds to a thin non-porous portion of anodic oxide film 302 at an interface between metal substrate 304 and anodic oxide film 302. In this way, thickness 307 of barrier layer 308 is defined by metal substrate 304 on one side and pore terminuses 309 on another side. After a typical pore-forming anodizing process in sulfuric acid-based bath, barrier layer 308 has a thickness of a few nanometers or a couple of tens of nanometers.

As described above, anodic oxide film 302 can include defects such as crack 310, which can span the entire thickness 311 of anodic oxide film 302 and exposed a portion of metal substrate 304. Crack 310 can be formed by any mechanism, including mechanically or thermally induced strain, laser marking, defects related to grain boundaries of metal substrate 304, and/or geometry of metal substrate 304, as described above. Crack 310 can act as a pathway for moisture or other corrosion-inducing agents to pass through anodic oxide film 302 and reach underlying metal substrate 304.

Figure 3B:
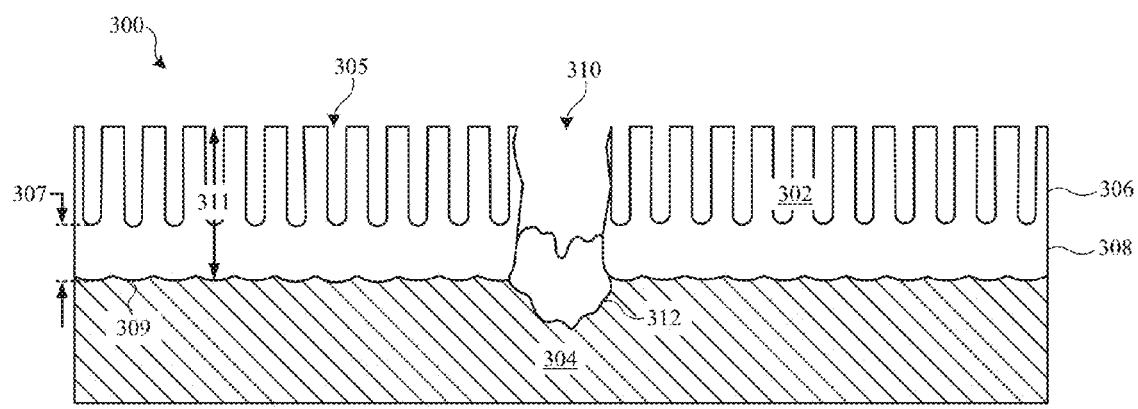

FIG. 3B shows the part 300 after an additional anodizing process is performed, which increases thickness 307 of the barrier layer 308 portion of anodic oxide film 302, including at the interface of metal substrate 304 and anodic oxide film 302 at the site of crack 310. In some embodiments, barrier layer 308 is substantially uniformly thickened. In other embodiments, barrier layer 308 is thickened more at the site of crack 310. In any case, this thickening of barrier layer 308 can create metal oxide plug 312, within crack 310 and over previously exposed portions of metal substrate 304. As with barrier layer 308, metal oxide plug 312 is composed of a metal oxide material as a result of the oxidative conversion of metal substrate 304.

Unlike the anodizing process for forming porous portion 306, the subsequent anodizing process for thickening barrier layer 308 can involve a non-pore-forming anodizing process that promotes growth and thickening of barrier layer 308. A non-pore-forming anodizing process generally involves growth of metal oxide material without substantial simultaneous dissolution of the metal oxide material. Thus, metal oxide plug 312 can be non-porous, thereby providing a better barrier between metal substrate 304 and the environment. This is in contrast to a dissolution anodizing process, such as the anodizing process used to form the first portion of anodic oxide film 302 at FIG. 3A.

Non-pore-forming anodizing processes can involve the use of an electrolytic bath that promotes metal oxide growth without substantial dissolution and without substantial pore formation. Examples of non-pore-forming solutions which are suitable for the additional anodizing operation include electrolytes having any of a number of weak organic acids, such as one or more of formic acid, malonic acid, maleic acid and tartaric acid—as well as neutral and basic solutions such as one or more of ammonium adipate, sodium borate, sodium hydrogen phosphate, sodium hydroxide and sodium sulfate. In some embodiments, the non-pore-forming electrolyte includes one or both of tartaric acid and sodium tetra-borate. In a non pore-forming electrolyte, barrier layer 308 can achieve a thickness 307 of tens or hundreds of nanometers, depending on the voltage used during the anodizing operation. In a particular embodiment, an electrolyte with tartaric acid in a concentration of about 100 g/l was used. In another particular embodiment, substantially equivalent results (as the tartaric acid, 100 g/l) were obtained using sodium tetraborate in a concentration of about 15 g/l. The applied voltages can vary depending on a desired thickness of barrier layer 308. In some embodiments, thickness 307 of barrier layer 308 in nanometers is typically about 1.3 times the applied voltage. In some embodiments, suitable voltages range between about 50 V and 300 V. In one embodiment, a voltage of about 200 V is used.

Although barrier layer 308 may not provide significant abrasion resistance on its own (i.e., without the presence of porous portion 306), it benefits from the mechanical protection of adjacent porous portion 306. That is, the greater thickness 307 of barrier layer 308 (compared to a conventional barrier layer of just a few or tens nanometers) can provide improved corrosion resistance, while porous portion 306 can provide structural integrity and abrasion resistance.

As described above, the additional anodizing operation can be performed before and/or after a sealing process. When it is performed before sealing, it can uniformly thicken barrier layer 308 at terminuses 309 of substantially all pores 305, as show in FIGS. 2B and 3B). In contrast, when the additional anodizing operation is performed after sealing, barrier layer growth can be localized in areas that lack adequate protection, i.e., at the base of cracks or other defects.

Figure 4A:
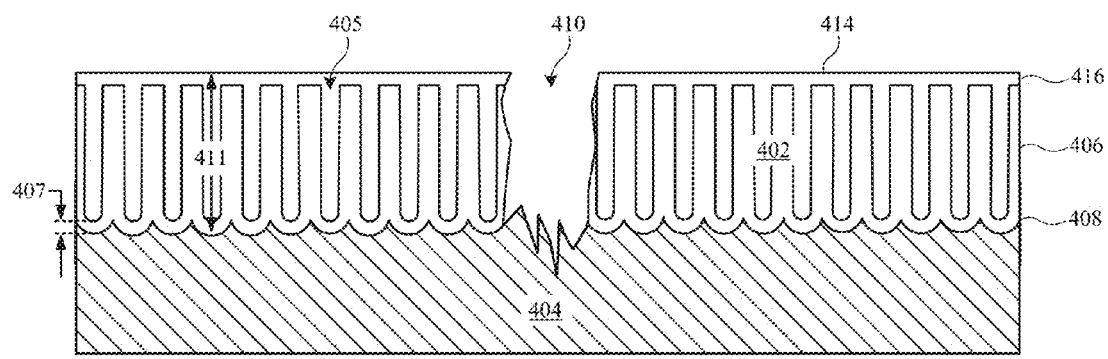
FIGS. 4A and 4B show cross-section views of an anodized part after a sealing process and a barrier layer thickening process, respectively.
Figure 4B:
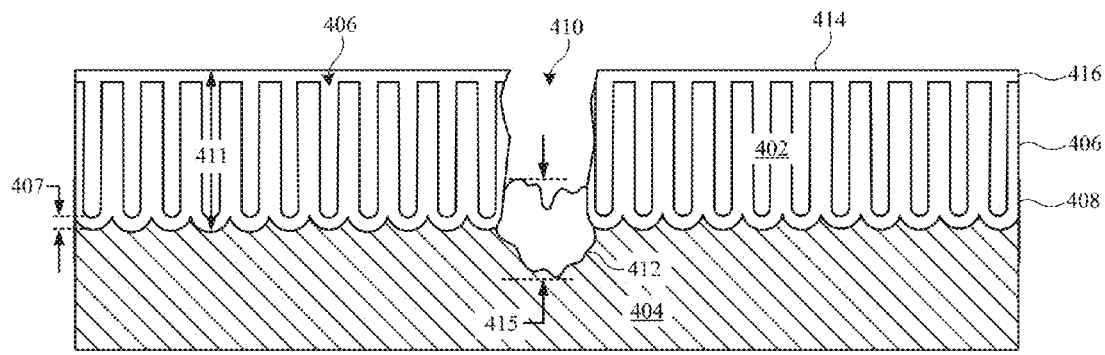

FIGS. 4A and 4B show part 400 after a sealing process and a subsequent additional anodizing process has been performed. FIG. 4A shows part 400, which includes anodic oxide film 402 formed over metal substrate 404. Any suitable pore-forming anodizing process can be used, as described above. Anodic oxide film 402 includes porous portion 406 and barrier layer 408. In some embodiments, pores 405 are infused with a colorant, such as a dye or metal colorant (not shown), which imparts a corresponding color to anodic oxide film 402. After the sealing process is performed, the openings of pores 405 outer surface 414 of anodic oxide film 402 are sealed, thereby increasing the corrosion protection ability of anodic oxide film 402 and sealing in colorant (if any) within pores 405. The sealing process typically involves a hydrothermal sealing operation, whereby anodic oxide film 402 is exposed to a heated aqueous solution or steam. This can hydrate the metal oxide material, converting exposed surfaces of anodic oxide film 402 into a corresponding metal oxide hydrate 416 form. In some embodiments, the aqueous solution or steam includes nickel acetate or other additive to enhance the sealing operation.

As shown, crack 410 can span the entire thickness 411 of anodic oxide film 402. Although the sealing operation can sufficiently swell the metal oxide material of anodic oxide film 402 to seal pores 405, it may not be sufficient to seal crack 410 if crack 410 is about one micrometer wide or wider. Thus, at FIG. 4B, an additional anodizing operation is implemented to grow, repair or thicken portions of barrier layer 408 at the base of crack 410. As with the additional anodizing process described above with reference to FIGS. 3A and 3B, the barrier layer thickening process can be a substantially non-pore-forming process such dissolution of metal oxide material is minimized.

Since anodic oxide film 402 is sealed, the electrolyte used in the anodizing process may not readily access metal substrate 404 via pores 405. The electrolyte, however, can more readily access metal substrate 404 via crack 410. Thus, the anodizing preferably converts the portion of metal substrate 404 at the base of crack 410, thereby forming a localized metal oxide plug 412. Thickness 415 of metal oxide plug 412 can vary depending on process parameters of the non-pore-forming anodizing process, as described above with reference to FIG. 3B. In some embodiments, thickness 415 of metal oxide plug 412 is tens or hundreds of nanometers. In some embodiments, thickness 407 of the portion of barrier layer 408 outside of the region around the base of crack 410 remains substantially the same as prior to the additional anodizing process is performed—in other embodiments, this thickness 407 increases. Generally, however, thickness 415 of metal oxide plug 412 is generally larger than thickness 407 of the remaining portions of barrier layer 408 where anodic oxide film 402 does not have a crack or other defect.

One of the benefits of methods described herein is most evident on an alloy, which can be inherently somewhat corrosion-prone. For example, some 7000 series aluminum alloys that include relatively high concentrations of magnesium and zinc alloying elements have high strength compared to typical 6000 series aluminum alloys. However, these alloying elements can make certain 7000 series aluminum alloys slightly more prone to corrosion. That is, a non-anodized surface of a 7000 series may be more prone to corrosion under certain environmental exposures (e.g., prolonged sweat, etc.) than an equivalent anodized surface of a 6000 series aluminum alloy. Metal alloys with anodized surfaces are generally well protected against corrosion, but can exhibit localized corrosion sensitivity after, for example, an infrared laser has been used to generate dark marks by locally melting the metal at the metal/oxide interface, as described above. In particular, a 72-hour ASTM B117 salt mist exposure yielded corrosion on about 10% of laser marked regions of an anodized 7000-series aluminum alloy part. However, when the part is protected by the embodiments described herein, this corrosion is eliminated under the same testing conditions.

Further quantitative evidence of the corrosion resistance improvement is offered by corrosion potential measurements and corrosion current density measurements, as indicated by Table 1 below.

TABLE 1

| Sample | Process | Open circuit potential mV versus SCE | Corrosion current density A cm$^{-2}$ |
|---|---|---|---|
| 1 | Bare 7000-series alloy | −926 ± 3 | 8.7E−07 ± 6.4E−08 |
| 2 | Ano A + Seal 1 | −216 ± 52 | 2.2E−10 ± 7.1E−11 |
| 3 | Ano A + Seal 2 | −286 ± 8 | 3.9E−10 ± 6.4E−11 |
| 4 | Ano A + Seal 3 | −270 ± 104 | 1.1E−10 ± 9.7E−11 |
| 5 | Ano A + Seal 4 | −241 ± 13 | 3.4E−10 ± 9.2E−11 |
| 6 | Ano B | −254 ± 13 | 1.3E−10 ± 8.1E−11 |
| 7 | Ano A + Barrier layer thickening | 213 ± 48 | 7.6E−12 ± 7.5E−11 |

Table 1 shows open circuit potentials and corrosion current densities for substrate samples 1-7 of the same type of 7000-series aluminum processed in different ways. Sample 1 corresponds to a bare substrate that has not undergone an anodizing process. Sample 2 corresponds to a substrate after a pore-forming anodizing process (Ano A) and a first type of sealing process are performed. In some embodiments, the pore-forming anodizing process (Ano A) is a sulfuric acid-based anodizing process, and the sealing process is a hydrothermal sealing process. Sample 3 corresponds to a substrate after a pore-forming anodizing process (Ano A) and a second type of sealing process are performed. Sample 4 corresponds to a substrate after a pore-forming anodizing process (Ano A) and a third type of sealing process are performed. Sample 5 corresponds to a substrate after a pore-forming anodizing process (Ano A) and a fourth type of sealing process are performed. Sample 6 corresponds to a substrate after a non-forming anodizing process (Ano B) is performed. Sample 7 corresponds to a substrate after a pore-forming anodizing process and a barrier layer thickening process are performed. The barrier layer thickening process of sample 7 involves further anodizing the substrate with a non-pore-forming anodizing process using 200 V.

Sample 1 (bare substrate) has high open circuit potential, as indicated by the large negative value −926 mV+/−3. Anodizing using a pore-forming anodizing process (Ano A) or non-pore-forming anodizing process (Ano B) increases the open circuit potential, as indicated by samples 2-6. However, the open circuit potential of sample 7 indicates that anodizing using a pore-forming anodizing process (Ano A) followed by a barrier layer thickening process drastically increases the open circuit potential (213+/−48 mV).

Corrosion current density measurements yield similar results. The corrosion current density of sample 1 (bare substrate) is 8.7×10$^{-7}$ A cm$^{-2}$. Corrosion current density measurements of samples 2-6 show that anodizing reduces the corrosion current density by about three orders of magnitude, to between 1×10$^{-10}$ A cm$^{-2}$ and 3.9×10$^{-10}$ A cm$^{-2}$. However, corrosion current density of sample 7 indicates that anodizing using a pore-forming anodizing process (Ano A) followed by a barrier layer thickening process drastically reduces the corrosion current density (7.6×10$^{-12}$ A cm$^{-2}$).

Figure 5:
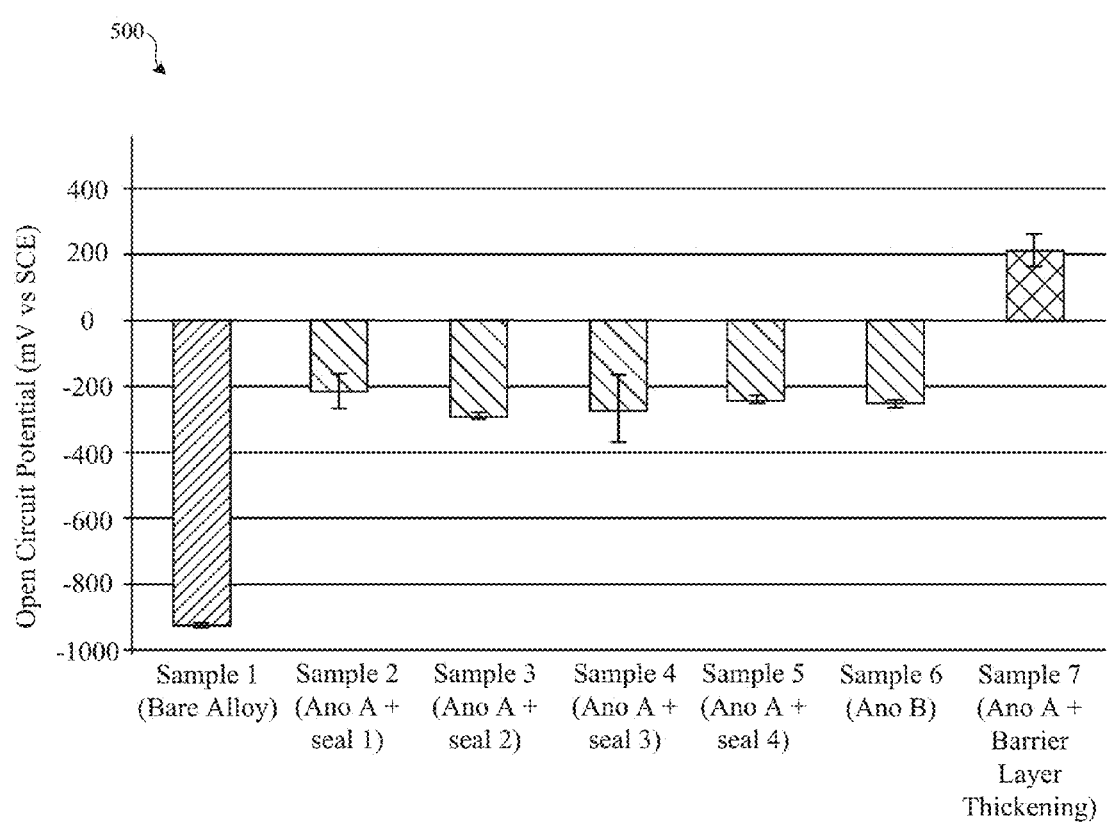
FIG. 5 shows a graph indicating open circuit potential measurement data for aluminum alloy substrates with and without undergoing a barrier layer thickening process.
Figure 6:
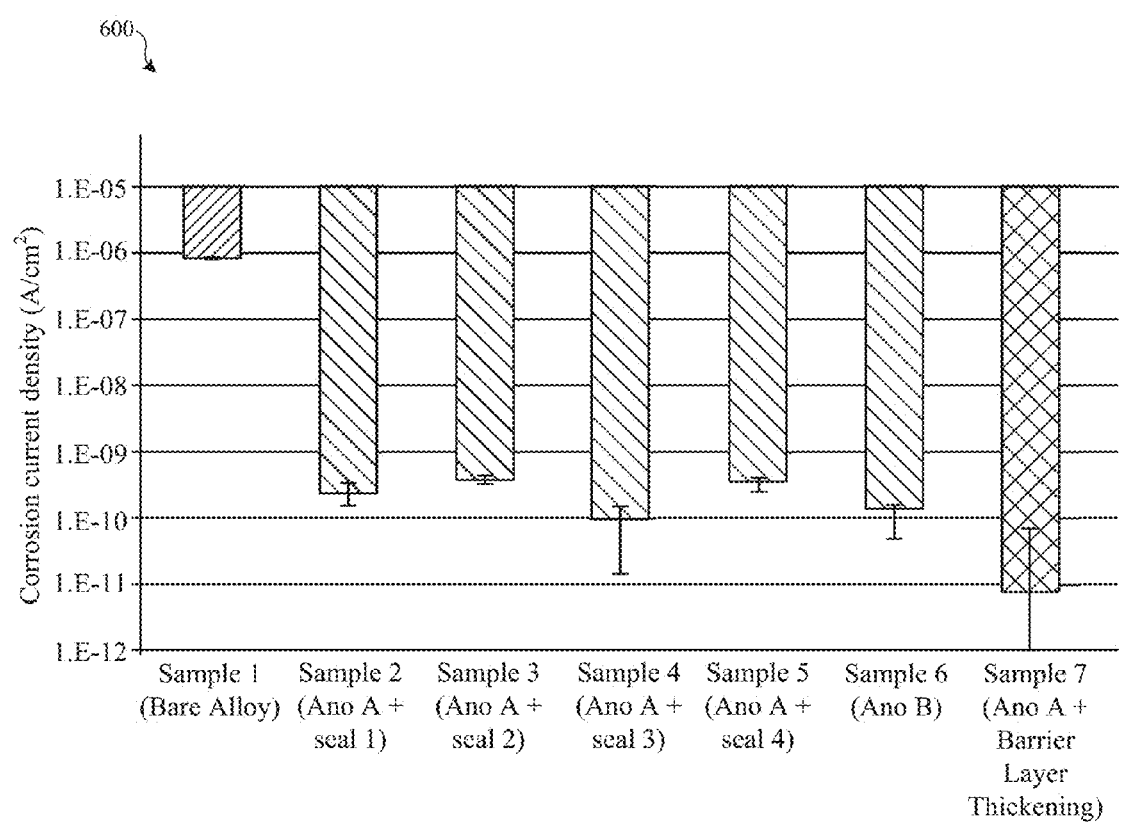
FIG. 6 shows a graph indicating open corrosion current density measurement data for aluminum alloy substrates with and without undergoing a barrier layer thickening process.

The data of Table 1 are graphically illustrated in the graphs of FIGS. 5 and 6. FIG. 5 shows graph 500, which plots open circuit potential measurements for samples 1-7. Graph 500 illustrates how anodizing using either a pore-forming anodizing process or a non-pore-forming anodizing process (samples 2-6) increases the open circuit potential measurement of a substrate compared to a bare substrate (sample 1). However, anodizing using a pore-forming anodizing process and a barrier layer thickening process (sample 7) significantly increases the open circuit potential measurement of a substrate.

FIG. 6 shows graph 600, which plots corrosion current density measurements for samples 1-7. Graph 600 illustrates how anodizing using either a pore-forming anodizing process or a non-pore-forming anodizing process (samples 2-6) decreases the corrosion current density measurement of a substrate compared to a bare substrate (sample 1). However, anodizing using a pore-forming anodizing process and a barrier layer thickening process (sample 7) significantly decreases the corrosion current density measurement of a substrate.

Figure 7:
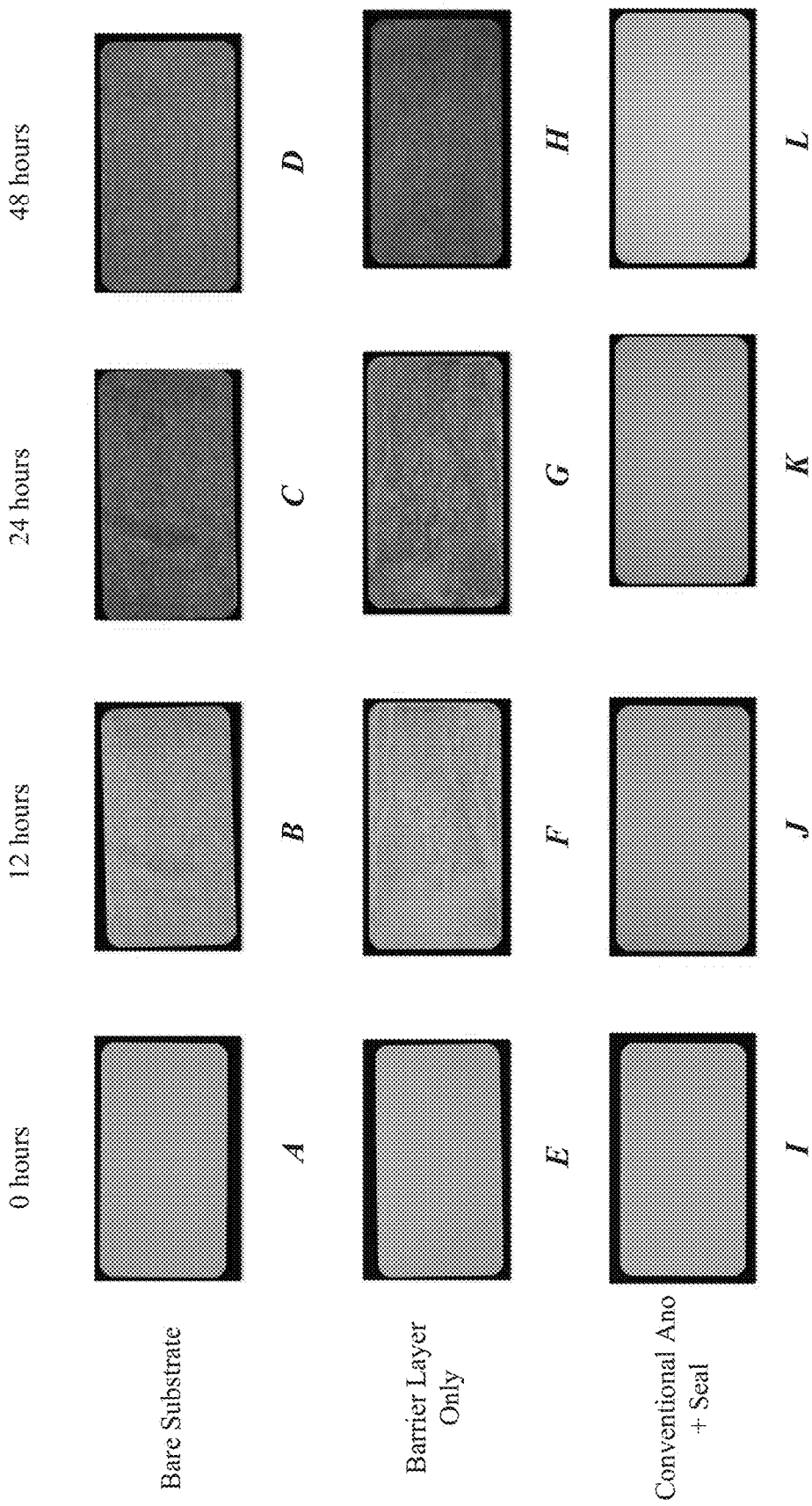
FIG. 7 shows images of a bare substrate, a substrate having only a barrier layer, and a substrate having a sealed conventional porous anodic film, after undergoing a neutral salt spray test to compare corrosion resistances.

FIG. 7 shows images of different aluminum alloy substrate samples after undergoing a neutral salt spray test (in accordance with ASTM B117) to test the corrosion resistance of the substrate samples (100 mm by 50 mm plaques). Samples A, B, C and D are bare aluminum alloy substrates that have not been anodized. Samples E, F, G and H are aluminum alloy substrates that have been anodized using a non-pore-forming anodizing process (without anodizing using a pore-forming anodizing process). Thus, samples E, F, G and H each have barrier-type films without overlying porous portions. The barrier-type films were formed using a 75 V non-pore forming anodizing process, corresponding to resultant non-porous film of about 100 nm in thickness. Samples I, J, K and L are aluminum alloy substrates that have been anodized using a conventional pore-forming anodizing process (e.g., type II anodizing process). The samples were exposed to salt spray for different amounts of time: 0 hours, 12 hours, 24 hours and 48 hours.

As expected, the bare substrate samples A, B, C and D are shown to have more discoloration with more salt spray exposure time, indicating significant corrosion of the aluminum alloy. Those samples I, J, K and L protected by a conventional porous anodic oxide film show little discoloration, indicating the conventional porous anodic oxide film can provide good corrosion protection under the salt spray conditions. It should be noted, however, that samples I, J, K and L protected by a conventional porous anodic oxide may experience corrosion if the porous anodic film develops cracks or defects as described above. In particular, for example, if a region of the surface has been laser-marked, it will typically exhibit local corrosion. FIG. 7 shows, unexpectedly, samples E, F, G and H protected by barrier-type films show significant discoloration, indicating corrosion at a similar rate to the bare unprotected substrate samples A, B, C and D. These results indicate that barrier-type films without overlying porous portions may not, in themselves, deliver significant corrosion protection in the corrosion scenarios of interest for use in enclosures for consumer electronic devices.

Figure 8A:
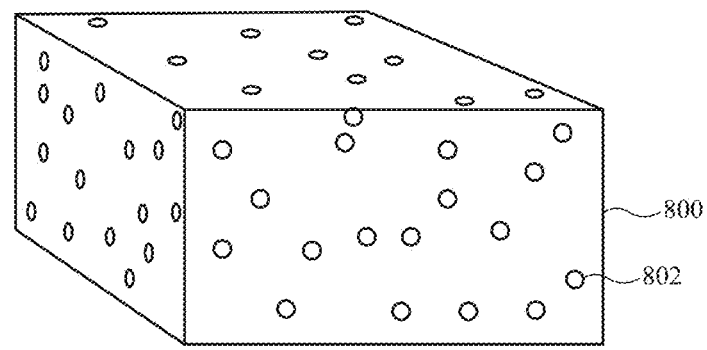
FIGS. 8A-8C show perspective views of sections of a metal alloy substrate, illustrating how second phase particles can affect the corrosion protection of a barrier-type film.
Figure 8B:
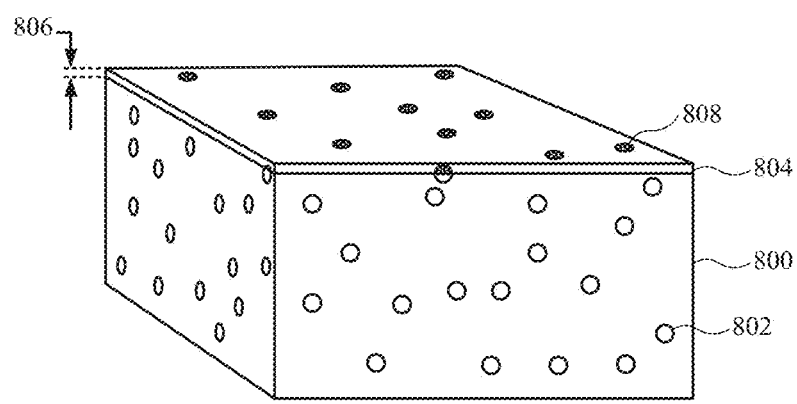
Figure 8C:
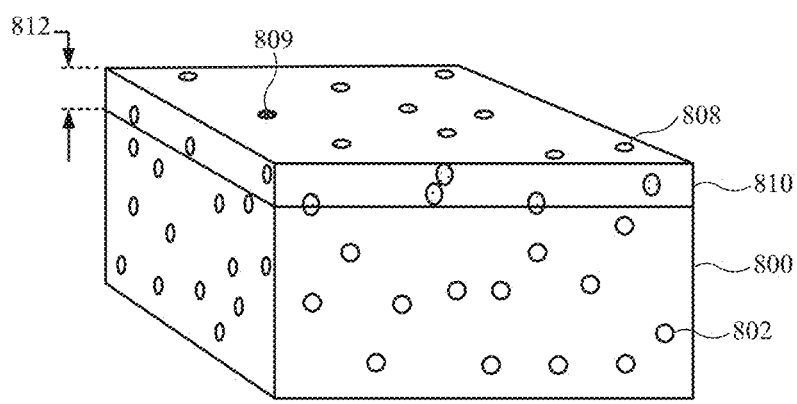

These results may be an indication of inhomogeneities in the alloy substrate. These aspects are illustrated in FIGS. 8A-8C, which show perspective views of sections of metal alloy substrate 800. FIG. 8A shows bare metal alloy substrate 800 in an inhomogeneous state, meaning second phase particles 802 (or clusters thereof) are distributed therein. Second phase particles 802 (or clusters thereof) are precipitates that contribute to the strength of metal alloy substrate 800. For example, in some aluminum alloys second phase particles 802 can correspond to copper-rich regions within metal alloy substrate 800.

FIG. 8B shows metal alloy substrate 800 after a portion is converted to thin barrier-type film 804, which corresponds to a non-porous anodic oxide film that can be formed using a non-pore-forming anodizing process, such as described above. Second phase particles 802 (or clusters thereof) within substrate 800 can result in corresponding discontinuities 808 within thin barrier-type film 804. Discontinuities 808 correspond to inhomogeneities within thin barrier-type film 804. For example, copper-rich regions as second phase particles 802 within some aluminum alloy substrates can result in copper-rich streak-like discontinuities 808 through barrier-type film 804. In FIG. 8B, thickness 806 of thin barrier-type film 804 is very thin (i.e., tens of nanometers), which can be comparable to the dimensions of discontinuities 808 or other inhomogeneities in thin barrier-type film 804. This means that discontinuities 808 may span thickness 806 of thin barrier-type film 804. In this way, discontinuities 808 can act as initiation sites for forming pathways for corrosion-inducing agents to pass through thin barrier-type film 804 and reach underlying substrate 800.

FIG. 8C shows metal alloy substrate 800 after a larger portion is converted to thick barrier-type film 810. As with thin barrier-type film 804, thick barrier-type film 810 corresponds to a non-porous anodic oxide film, which can be formed using a non-pore-forming anodizing process. However, thick barrier-type film 810 is grown to a larger thickness 812 compared to thickness 806 of thin barrier-type film 804. Although thick barrier-type film 810 can significantly reduce the incidence or spatial distribution of discontinuities 808 within thick barrier-type film 810 compared to thin barrier-type film 804 (e.g., by a full order of magnitude)—in some cases leaving a single discontinuity 808 in every square millimeter of a surface of thick barrier-type film 810. That is, barrier-type film 810 can lessen the number of discontinuities 808 that can act as corrosion initiation sites 809. Surprisingly, however, the reduced number of initiation sites 809 has not been found to limit corrosion of metal alloy substrate 800 and general corrosion of metal alloy substrate 800 will still occur. That is, thick barrier-type film 810 by itself is ineffective in general corrosion prevention. This is one of the reasons why such non-porous anodizing can be disregarded as a solution for general corrosion protection for metal alloy substrate 800.

Figure 9A:
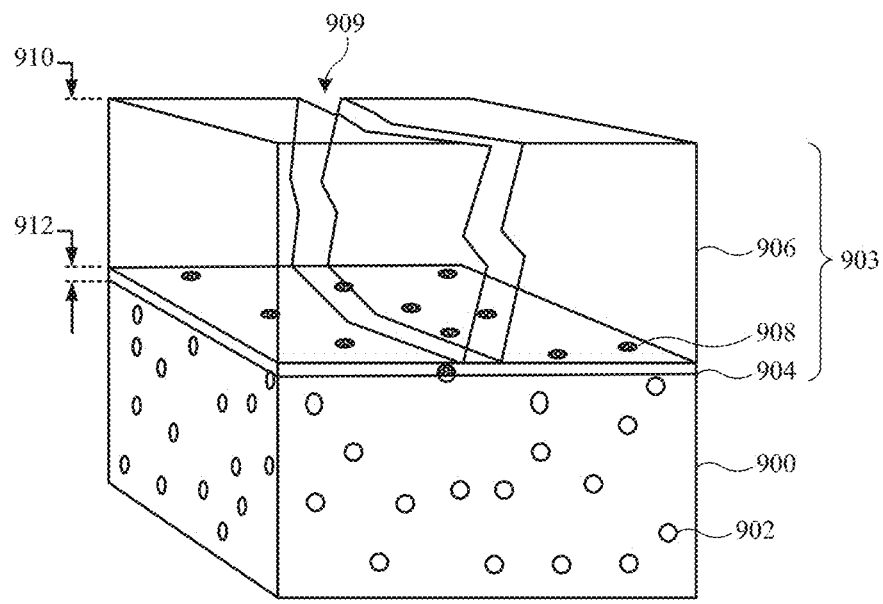
FIGS. 9A and 9B show perspective views of sections of an anodized metal alloy substrate, illustrating how a thick barrier layer and overlying porous anodic film have improved corrosion protection.
Figure 9B:
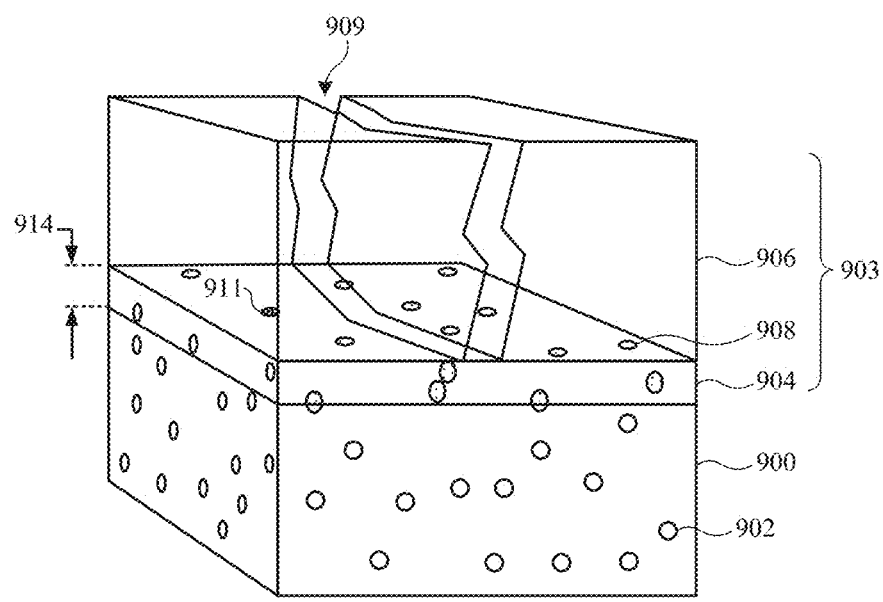

In some embodiments described herein, an anodic oxide film having a thick barrier layer portion and a porous portion is found to provide significant reduction in corrosion of an underlying metal alloy substrate. To illustrate, FIGS. 9A and 9B show perspective views of sections of metal alloy substrate 900. Metal alloy substrate 900 includes second phase particles 902 (or clusters thereof), which can contribute to the strength of metal alloy substrate 900.

At FIG. 9A, a portion of metal alloy substrate 900 is converted to porous anodic oxide film 903 using a pore-forming anodizing process, such as a type II anodizing (sulfuric acid) process. Type II anodizing, for example, typically results in porous anodic oxide film 903 having thickness 910 hundreds of times thicker than barrier-type films 804 or 810 described above with reference to FIGS. 8A-8C. Porous anodic oxide film 903 includes porous portion 906, as well as barrier layer 904 as a natural outcome of the pore-forming anodizing process. Barrier layer 904, however, has an extremely low thickness 912, i.e., on the scale of a few nanometers or a couple of tens of nanometers. Thus, when crack 909 (which in some cases has a width of about 1 micrometer or more) is formed within porous anodic oxide film 903 during, for example, one or more of the above-described crack-forming processes, barrier layer 904 may not deliver adequate corrosion protection to metal alloy substrate 900—especially if metal alloy substrate 900 is sensitive to corrosion. In particular, many discontinuities 908 can span thickness 912 of barrier layer 904, and thus can act as initiation sites for forming pathways for corrosion-inducing agents to pass through thin barrier layer 904 via crack 909 and reach underlying substrate 900.

FIG. 9B shows metal alloy substrate 900 after a barrier layer thickening process, whereby barrier layer 904 is increased to greater thickness 914. In some embodiments, this is achieved using a non-pore-forming anodizing process, as described above. Thickened barrier layer 904 can lessen the number of discontinuities 908 that can act as corrosion initiation sites 911. Compared to thick barrier-type film 810 of FIG. 8C, however, the presence of the very thick porous portion 906 of anodic oxide film 903 is found to provide additional corrosion protection such that metal alloy substrate 900 is adequately protected despite the presence of crack 909. These results indicate that, in some embodiments, it is when the statistically significant reduction in corrosion initiation sites 911 is combined with a thick anodic oxide film 903, which has its own independent population of defects, that a significant benefit in corrosion protection arises. In another words, crack 909 in anodic oxide film 903 means that only a small fraction of the surface of anodic oxide film 903 is relevant, and corrosion is much more dependent on the number of initiation sites 911 compared to thick barrier-type film 810 of FIG. 8C. An order of magnitude reduction in the spatial density of initiation sites 911 for corrosion now correlates to an order of magnitude improvement in corrosion resistance.

Figure 10:
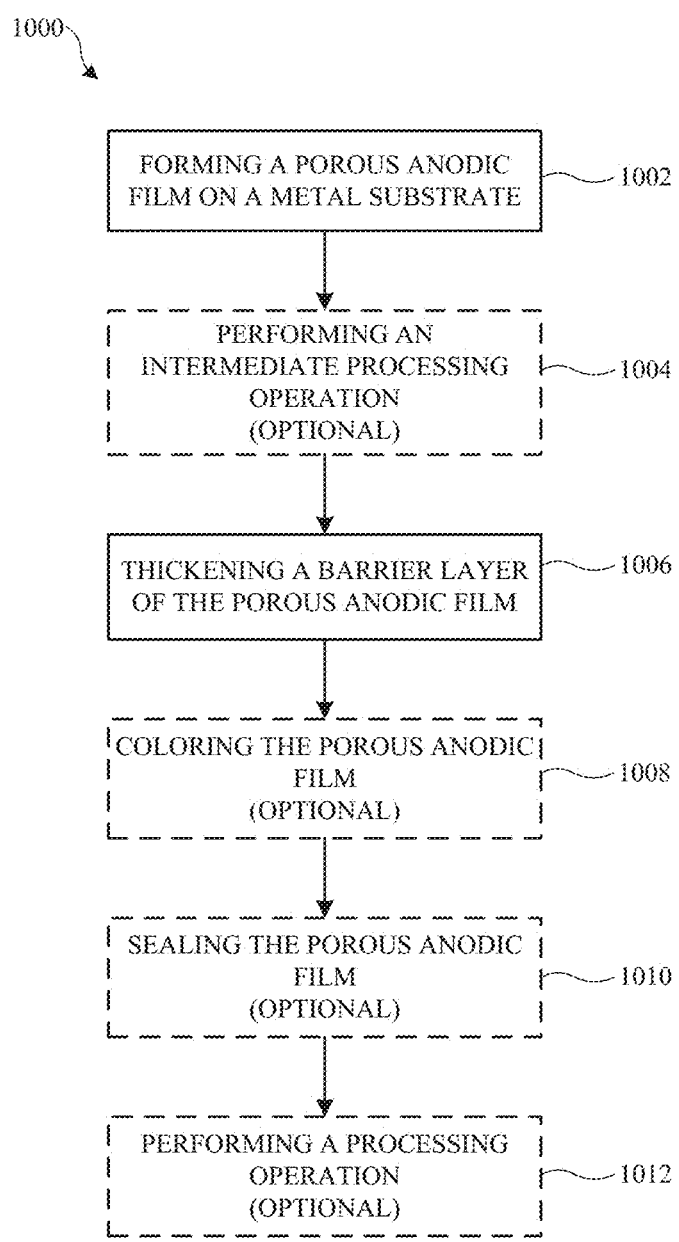
FIG. 10 shows a flowchart indicating a process for improving the corrosion protection of an anodized metal substrate by barrier layer thickening.

FIG. 10 shows flowchart 1000, indicating a process for improving the corrosion protection of an anodized metal substrate, in accordance with some embodiments. In some cases, the metal substrate is an aluminum alloy that is sensitive to corrosion, such as some aluminum alloys having relatively high levels of magnesium and zinc (e.g., some 7000 series aluminum alloys). In some cases, a surface of the metal substrate has been finished using, for example, one or more abrasive blasting, laser texturing, polishing or buffing operations.

At 1002, a porous anodic film is formed on the metal substrate. In some embodiments, a type II anodizing process is used, which can provide a relatively transparent and cosmetically appealing anodic film. At 1004, an intermediate processing operation, such as machining, and/or laser marking or texturing, is optionally performed. At 1006, the barrier layer of the porous anodic film is thickened. In some embodiments, the barrier layer is thickened to a pre-determined thickness, such as a target thickness of tens or hundreds of nanometers. The barrier layer thickening can be achieved by exposing the already anodized metal substrate to a non-pore-forming anodizing process. The final thickness of the barrier layer can depend on processing conditions—for example, the voltage used during the non-pore-forming anodizing process. After the non-pore-forming process is complete, the resultant anodic film retains its porous portion and also includes a thickened barrier layer.

At 1008, the porous anodic film is optionally colored. For example, a colorant (e.g., dye or metal) can be infused within pores of the porous portion of the anodic film. At 1010, the porous anodic film is optionally sealed using a sealing process. In some cases, the sealing is performed in a hot an aqueous solution (e.g., nickel acetate solution). Sealing the pores of the anodic film can increase the corrosion protection quality of the anodic film since the pores can act as pathways for corrosion-inducing agents (e.g., water, sweat) to come near, and possibly reach, the underlying metal substrate. The sealing process can also retain colorant within the anodic film if the anodic film is colored. At 1012, a processing operation is optionally performed. In some embodiments, the processing operation includes an anodic film polishing process or other post-sealing manufacturing process.

Figure 11:
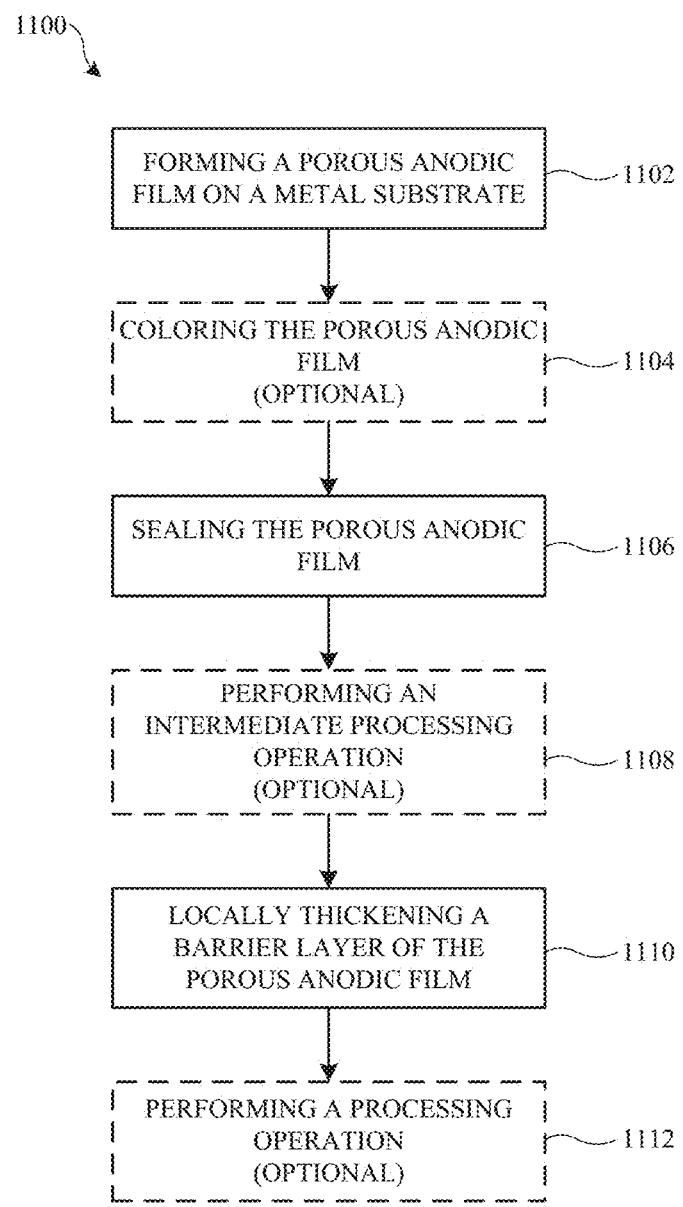
FIG. 11 shows a flowchart indicating a process for improving the corrosion protection of an anodized metal substrate by localized barrier layer thickening.

FIG. 11 shows flowchart 1100, indicating a process for improving the corrosion protection of an anodized metal substrate involving a post-sealing operation, in accordance with some embodiments. As with flowchart 1000 of FIG. 10, in some embodiments, the metal substrate is an aluminum alloy that is sensitive to corrosion, such as some aluminum alloys having relatively high levels of magnesium and zinc (e.g., some 7000 series aluminum alloys). Prior to anodizing, in some cases, a surface of the metal substrate has been finished using, for example, one or more abrasive blasting, laser texturing, polishing or buffing operations.

At 1102, a porous anodic film is formed on the metal substrate using a pore-forming anodizing process, such as a type II anodizing process. At 1104, the porous anodic film is optionally colored, for example, by infusing a colorant within the pores. At 1106, the porous anodic film is optionally sealed to increase the corrosion protection quality of the anodic film and retain colorant within the anodic film if the anodic film is colored. At 1108, an intermediate processing operation, such as machining, and/or laser marking or texturing, is optionally performed.

At 1110, the barrier layer of the porous anodic film is locally thickened at locations where any cracks within the anodic film exist, and which are too wide for the sealing process to seal. This can create a sort of metal oxide plug that selectively protects the underlying metal substrate at locations corresponding to cracks and other defect within the anodic film. In some embodiments, the localized barrier layer is thickened to a pre-determined thickness, such as a target thickness of tens or hundreds of nanometers. The localized barrier layer thickening can be achieved by exposing the already anodized and sealed substrate to a non-pore-forming anodizing process. The final thickness of the metal oxide plug can depend on processing conditions—for example, the voltage used during the non-pore-forming anodizing process. At 1112, an optional processing operation, such as an anodic film polishing process or other post-sealing manufacturing process, can be performed.

Figure 12:
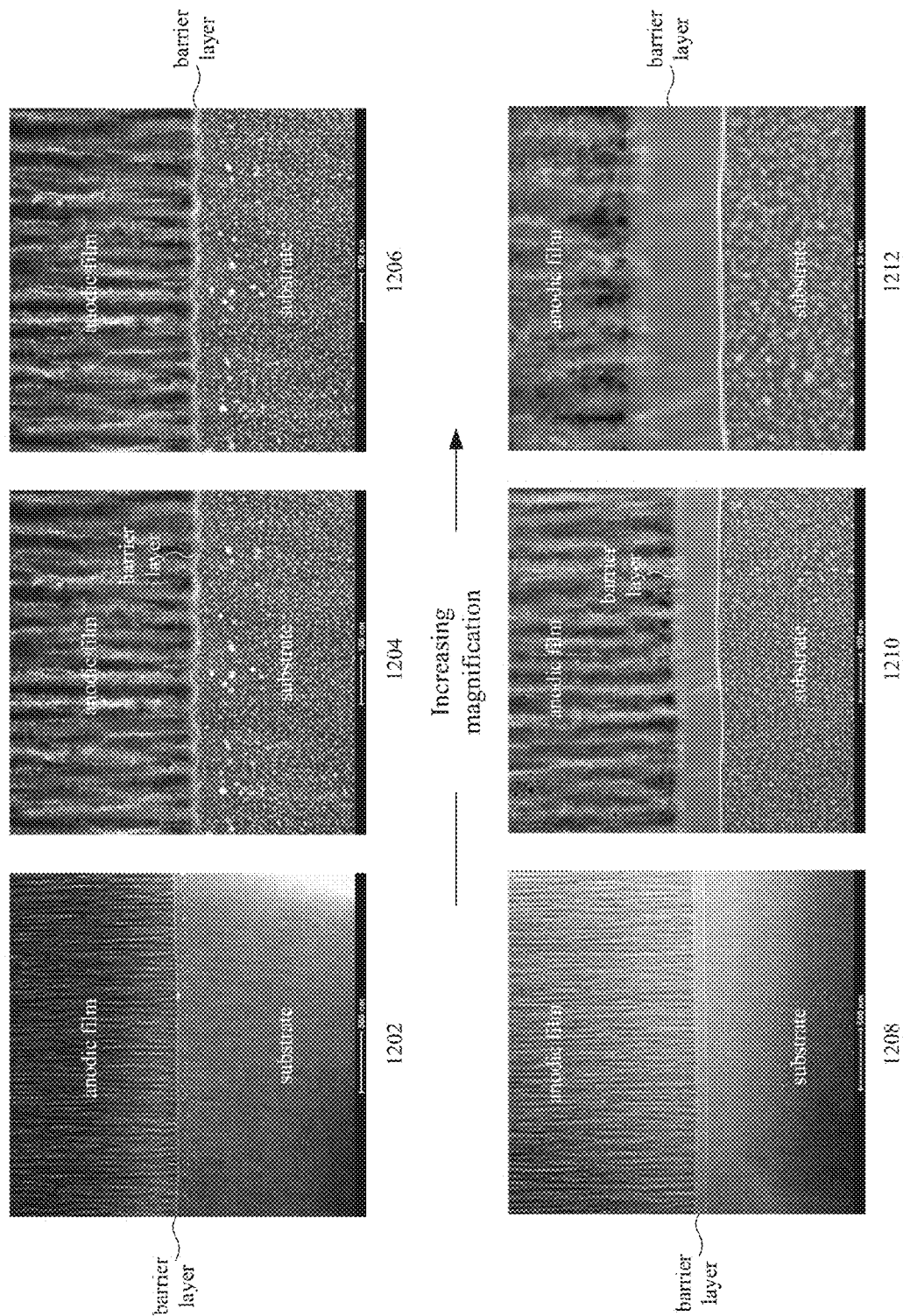
FIG. 12 shows cross-section scanning transmission electron microscopy (STEM) images of anodized aluminum alloy samples with and without barrier layer thickening, as imaged with a high-angle annular dark field (HAADF) detector.
Figure 13:
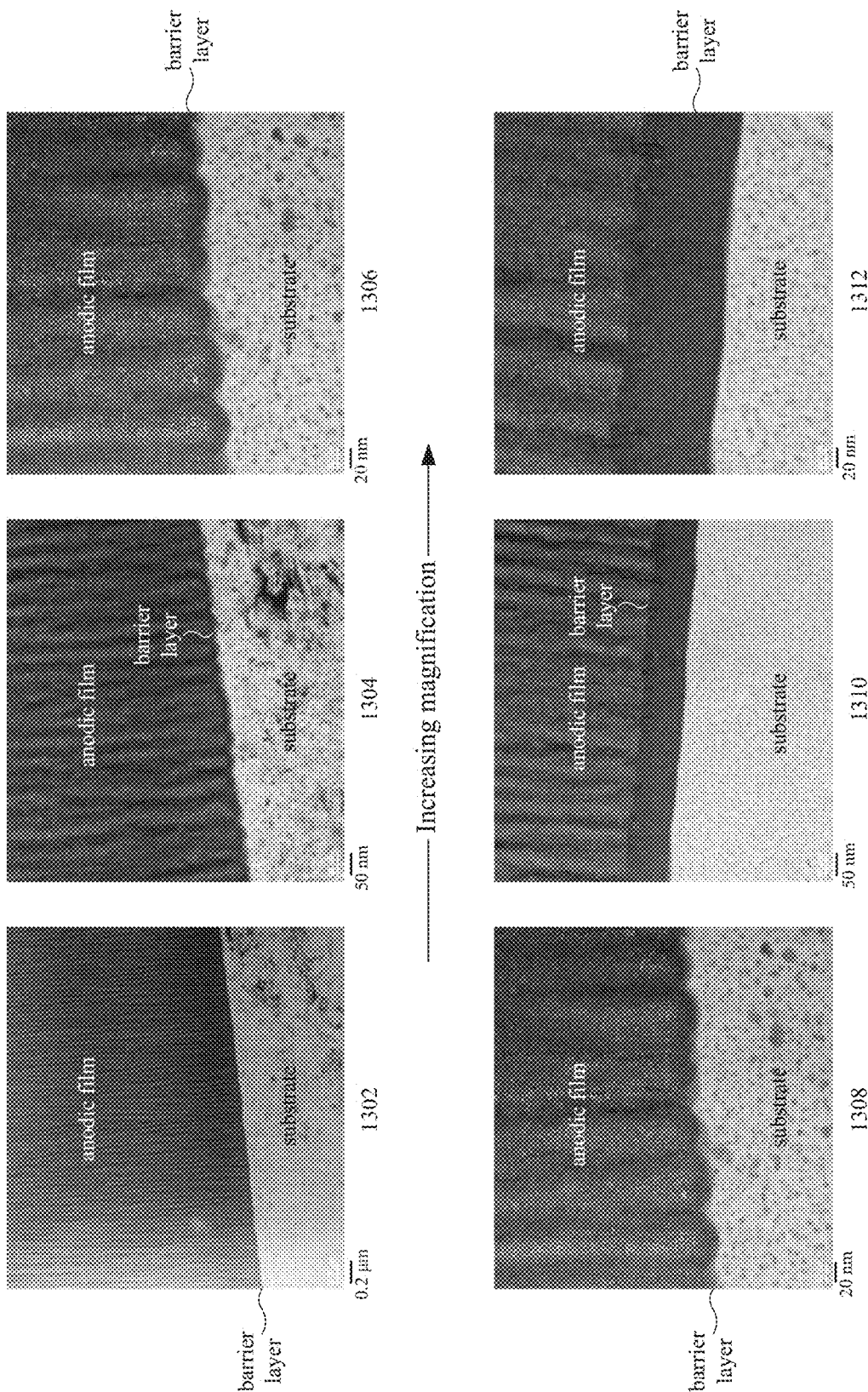
FIG. 13 shows cross-section STEM images of anodized aluminum alloy samples with and without barrier layer thickening, as imaged using bright field (BF) mode imaging.

FIGS. 12 and 13 show scanning transmission electron microscopy (STEM) cross-section images of anodized aluminum alloy samples with and without barrier layer thickening. In FIG. 12, the samples were imaged using a high-angle annular dark field (HAADF) detector. Images 1202, 1204 and 1206 show an anodized aluminum alloy substrate (substrate), at three different magnifications, that has not undergone a barrier layer thickening operation. Images 1208, 1210 and 1212 show an anodized aluminum alloy substrate, at three different magnifications, after undergoing a barrier layer thickening operation. As shown, the barrier layer of the sample having undergone the barrier layer thickening (images 1208, 1210 and 1212) is about 100 nanometers in thickness, whereas the barrier layer of the sample without the barrier layer thickening (images 1202, 1204 and 1206) is about 10 nanometers or less.

In FIG. 13, the samples were imaged using bright field (BF) mode imaging. Images 1302, 1304 and 1306 show an anodized aluminum alloy substrate (substrate), at three different magnifications, that has not undergone a barrier layer thickening operation. Images 1308, 1310 and 1312 show an anodized aluminum alloy substrate), at three different magnifications, after undergoing a barrier layer thickening operation. As with the images of FIG. 12, these images show the barrier layer of the sample having undergone the barrier layer thickening (images 1308, 1310 and 1312) is about 100 nanometers in thickness, whereas the barrier layer of the sample without the barrier layer thickening (images 1302, 1304 and 1306) is about 10 nanometers.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The invention claimed is:

1. An enclosure for a portable electronic device, the enclosure comprising:
   a metal substrate;
   an anodic coating overlaying a surface of the metal substrate, wherein the anodic coating includes a defect region; and
   a metal oxide plug that is disposed within the defect region of the anodic coating.

2. The enclosure of claim 1, wherein the anodic coating includes a porous portion and a barrier layer.

3. The enclosure of claim 2, wherein the metal oxide plug corresponds to a thickened portion of the barrier layer.

4. The enclosure of claim 1, wherein the defect region corresponds to a crack within the anodic coating.

5. The enclosure of claim 1, wherein the defect region is a crack propagating from a grain boundary within the metal substrate.

6. The enclosure of claim 1, wherein the defect region corresponds to a surface feature of the metal substrate.

7. An enclosure for a portable electronic device, the enclosure comprising:
   a metal substrate having a surface that includes a surface feature; and
   a metal oxide coating covering the surface of the metal substrate, the metal oxide coating including (i) an interstice that is dependent upon the surface feature of the metal substrate, and (ii) a metal oxide plug disposed within the interstice.

8. The enclosure of claim 7, wherein the interstice is a crack having a width of about one micrometer or greater.

9. The enclosure of claim 7, wherein the metal oxide plug is non-porous.

10. The enclosure of claim 7, wherein the interstice defines a moisture ingress pathway to the metal substrate, and the metal oxide plug prevents moisture from reaching the metal substrate.

11. The enclosure of claim 7, wherein the surface of the metal substrate is a textured surface, and the surface feature corresponds to a peak of the textured surface.

12. The enclosure of claim 7, wherein the surface feature corresponds to a grain boundary of the metal substrate.

* * * * *